United States Patent
Jeong et al.

(10) Patent No.: US 12,508,963 B2
(45) Date of Patent: Dec. 30, 2025

(54) HEAT PUMP SYSTEM FOR A VEHICLE

(71) Applicants: HYUNDAI MOTOR COMPANY, Seoul (KR); KIA CORPORATION, Seoul (KR)

(72) Inventors: Seong-Bin Jeong, Seongnam-si (KR); Jae-Eun Jeong, Hwaseong-si (KR); Yong Woong Cha, Yongin-si (KR); Wan Je Cho, Hwaseong-si (KR)

(73) Assignees: HYUNDAI MOTOR COMPANY, Seoul (KR); KIA CORPORATION, Seoul (KR)

( * ) Notice: Subject to any disclaimer, the term of this patent is extended or adjusted under 35 U.S.C. 154(b) by 99 days.

(21) Appl. No.: 18/658,296

(22) Filed: May 8, 2024

(65) Prior Publication Data

US 2025/0187506 A1 Jun. 12, 2025

(30) Foreign Application Priority Data

Dec. 7, 2023 (KR) .................... 10-2023-0176610

(51) Int. Cl.
*B60N 2/56* (2006.01)

(52) U.S. Cl.
CPC ......... *B60N 2/5614* (2013.01); *B60N 2/5628* (2013.01)

(58) Field of Classification Search
CPC ............................ B60N 2/5614; B60N 2/5628; B60H 1/00007; B60H 1/00278; B60H 1/00385; B60H 1/00914; B60H 1/00921; B60H 1/3213; B60H 1/32281

USPC .......................................... 165/202
See application file for complete search history.

(56) References Cited

U.S. PATENT DOCUMENTS

| | | | |
|---|---|---|---|
| 11,376,921 B2 * | 7/2022 | Kim ................... | B60H 1/00921 |
| 11,794,550 B2 * | 10/2023 | Kim ................... | B60H 1/00278 |
| 12,304,280 B2 * | 5/2025 | Shey .................. | B60H 1/32284 |
| 12,319,127 B2 * | 6/2025 | Durrani ............... | B60H 1/3205 |
| 12,370,865 B2 * | 7/2025 | Cho ................... | B60H 1/00278 |
| 2022/0412611 A1 * | 12/2022 | Brown ................. | F25B 41/20 |
| 2024/0174053 A1 * | 5/2024 | Kim ................... | B60H 1/00921 |
| 2024/0399826 A1 * | 12/2024 | Hu ..................... | B60H 1/32281 |
| 2025/0128569 A1 * | 4/2025 | Kim ................... | B60H 1/00921 |
| 2025/0187405 A1 * | 6/2025 | Jeong .................. | B60H 1/32284 |
| 2025/0187506 A1 * | 6/2025 | Jeong .................. | B60N 2/5614 |

FOREIGN PATENT DOCUMENTS

| | | | | |
|---|---|---|---|---|
| CN | 120116688 A | * | 6/2025 | ........... B60H 1/3228 |
| CN | 120116689 A | * | 6/2025 | ........... B60H 1/3228 |
| KR | 20220028855 A | | 3/2022 | |
| KR | 20250087142 A | * | 6/2025 | ........... B60H 1/3228 |

* cited by examiner

*Primary Examiner* — Jon T. Schermerhorn, Jr.
(74) *Attorney, Agent, or Firm* — Lempia Summerfield Katz LLC

(57) ABSTRACT

A heat pump system for a vehicle may efficiently adjust the temperature of heating elements by using a chiller where a refrigerant and a coolant exchange heat. At the same time, the heat pump system may efficiently perform cooling and heating of a rear seat by using a rear heating, ventilation, and air conditioning (HVAC) module provided with a heat-exchanger.

20 Claims, 5 Drawing Sheets

HEAT PUMP SYSTEM FOR A VEHICLE

CROSS-REFERENCE TO RELATED APPLICATION

This application claims priority to and the benefit of Korean Patent Application No. 10-2023-0176610, filed in the Korean Intellectual Property Office on Dec. 7, 2023, the entire contents of which are incorporated herein by reference.

BACKGROUND

(a) Field

The present disclosure relates to a heat pump system for a vehicle. More particularly, the present disclosure relates to a heat pump system for a vehicle capable of efficiently adjusting the temperature of the heating element and efficiently performing cooling and heating of a rear seat.

(b) Description of the Related Art

Generally, an air conditioning system for a vehicle includes an air conditioner unit circulating a refrigerant in order to heat or cool an interior of the vehicle.

The air conditioner unit, which is used to maintain the interior of the vehicle at an appropriate temperature regardless of a change in an external temperature, is configured to heat or cool the interior of the vehicle. This is achieved by heat-exchange using a condenser and an evaporator in a process in which a refrigerant discharged by a compressor is circulated through the condenser, a receiver drier, an expansion valve, and the evaporator, and then back to the compressor.

In other words, the air conditioner unit lowers the temperature and humidity of the interior of the vehicle by condensing a high-temperature high-pressure gas-phase refrigerant compressed from the compressor by the condenser, passing the refrigerant through the receiver drier and the expansion valve, and then evaporating the refrigerant in the evaporator in a cooling mode.

Recently, in accordance with a continuous increase in interest in energy efficiency and environmental pollution, the development of an environmentally-friendly vehicle capable of substantially substituting for an internal combustion engine vehicle is desired. The environmentally-friendly vehicle is classified into an electric vehicle driven using a fuel cell or electricity as a power source and a hybrid vehicle driven using an engine and a battery.

Among these environmentally-friendly vehicles, a separate heater is not used unlike an air conditioner of a general vehicle. Additionally, an air conditioner used in the environmentally-friendly vehicle is generally called a heat pump system.

The electric vehicle driven by the power source of the fuel cell generates driving force by converting chemical reaction energy between oxygen and hydrogen into electrical energy. In this process, heat energy is generated by a chemical reaction in a fuel cell. Therefore, it is desired to secure the performance of the fuel cell by effectively removing generated heat.

In addition, the hybrid vehicle generates driving force by driving a motor using electricity supplied from the fuel cell described above or an electrical battery, together with an engine operated by a general fuel. Therefore, heat generated from the fuel cell or the battery and the motor should be effectively removed in order to secure the performance of the motor.

With the development of autonomous driving technology and the proliferation of purpose-built vehicles, the region of the vehicle cabin is increasingly used as an office space, a rest space, a play space, and the like. Thus, a desired for a vehicle cabin space gradually increases.

Accordingly, an imbalance of temperatures at the front and rear seats may occur during the temperature adjustment in the vehicle interior. In order to prevent this, the vehicle is equipped with a front heating, ventilation, and air conditioning (HVAC) module and a rear HVAC module, to independently adjust the temperature at the front seats and the rear seats.

Since the conventional rear HVAC module only performs the function of cooling, improvements are desired so that it can also perform the function of heating.

However, in order to perform both cooling and heating functions in the rear HVAC module, separate heat-exchangers for cooling and heating and an opening/closing door to control the flow direction of the blown air (ambient air) may be configured. As a result, disadvantages arise in that the production cost is high, and the overall weight of the vehicle increases due to the increase in components.

In addition, connection pipes may be connected to supply an operational fluid to each heat-exchanger included in the rear HVAC module, resulting in a disadvantageous complex layout of connection pipes, and constrained space availability within narrow mounting spaces.

The above information disclosed in this Background section is only to enhance understanding of the background of the disclosure. Therefore, the Background section may contain information that does not form the prior art that is already known to a person of ordinary skill in the art.

SUMMARY

The present disclosure provides a heat pump system for a vehicle capable of efficiently adjusting the temperature of heating elements by using a chiller where a refrigerant and a coolant exchange heat.

In addition, the present disclosure also provides a heat pump system for a vehicle capable of efficiently performing cooling and heating of a rear seat by using a rear heating, ventilation, and air conditioning (HVAC) module provided with a heat-exchanger.

A heat pump system for a vehicle may include a compressor configured to compress a refrigerant, and a front HVAC module. The front HVAC module may be internally provided with an internal condenser, an evaporator connected to the compressor via a refrigerant line, and an opening/closing door configured to adjust the air having passed through the evaporator to be selectively introduced into the internal condenser at a time of cooling or heating a vehicle interior. The front HVAC may be configured to adjust a temperature of a front seat. The heat pump system may also include: a first heat-exchanger connected to the internal condenser via the refrigerant line; a first expansion valve provided on the refrigerant line between the first heat-exchanger and the evaporator; a first connection line having a first end connected to the refrigerant line between the first heat-exchanger and the first expansion valve and a second end connected to the refrigerant line between the evaporator and the compressor; and a chiller provided on the first connection line and configured to exchange heat between a selectively introduced coolant and the refrigerant to adjust a temperature of the coolant. The heat pump system may also include a second heat-exchanger configured to exchange heat between the refrigerant having passed through the internal condenser or the first heat-exchanger and the refrigerant having passed through at least one of the evaporator and the chiller such that a condensation level may be increased by increasing sub-cooling of the refrigerant. The second heat exchanger may be provided on the refrigerant line. The heat pump system may also include: a rear connection line connected to the refrigerant line through at least one valve; and a rear HVAC module interiorly provided with a third heat-exchanger connected to the rear connection line and configured to adjust a temperature of a rear seat at a time of cooling or heating the vehicle interior.

The second heat-exchanger may be connected to the refrigerant line connecting the first heat-exchanger and the first expansion valve and the refrigerant line connecting the evaporator and the compressor, respectively.

A heat pump system for a vehicle may further include: a second expansion valve provided on the first connection line at an upstream end of the chiller; a second connection line having a first end connected to the second expansion valve and a second end connected to the refrigerant line between the internal condenser and the first heat-exchanger; a third expansion valve provided on the refrigerant line between the internal condenser and the first heat-exchanger; and a third connection line having a first end connected to the third expansion valve and a second end connected to the refrigerant line between the first heat-exchanger and the second heat-exchanger. The heat pump system may further include: a first valve provided on the refrigerant line at an upstream end of the first expansion valve, and connected to a first end of the rear connection line; a fourth expansion valve provided on the rear connection line between the first valve and the third heat-exchanger; a bypass line having a first end connected to the rear connection line between the third heat-exchanger and the fourth expansion valve, and a second end connected to the rear connection line between the first valve and the fourth expansion valve; and a check valve provided on the bypass line.

The first heat-exchanger may be configured to condense or evaporate the refrigerant through heat-exchange with the ambient air based on a selective operation of the third expansion valve.

The second expansion valve and the third expansion valve may be electronic expansion valves configured to selectively expand the supplied refrigerant while controlling the flow of the refrigerant.

A heat pump system for a vehicle may further include: a second valve connected to a second end of the rear connection line; a fourth connection line having a first end connected to the second valve and a second end connected to the refrigerant line between the evaporator and the second heat-exchanger; and a fifth connection line having a first end connected to the second valve and a second end connected to the refrigerant line between the compressor and the internal condenser.

In a cooling mode of the vehicle interior, the first connection line may be closed by an operation of the second expansion valve. The second connection line may be closed by the operation of the second expansion valve. The third connection line may be closed by an operation of the third expansion valve. The rear connection line may be opened by an operation of the first valve and the second valve. The bypass line may be closed by an operation of the check valve. The fourth connection line may be opened by the operation of the second valve. The fifth connection line may be closed by the operation of the second valve. The refrigerant discharged from the internal condenser may flow along the refrigerant line, and may flow into the first heat-exchanger along the refrigerant line opened by the third expansion valve. The refrigerant having passed through the third heat-exchanger may flow along the fourth connection line connected to the rear connection line through the second valve. The first expansion valve and the fourth expansion valve may expand the introduced refrigerant. The operation of the second expansion valve may be stopped, and the third expansion valve may flow the refrigerant introduced via the refrigerant line to the first heat-exchanger without expansion.

The second heat-exchanger may exchange heat between the refrigerant having passed through the first heat-exchanger and the refrigerant having passed through the evaporator and the third heat-exchanger respectively.

In a heating mode of the vehicle interior, the refrigerant line connecting the first valve and the first expansion valve may be closed by an operation of the first valve. The refrigerant line connecting the first expansion valve and the evaporator may be closed by the first expansion valve. The refrigerant line connecting the third expansion valve and the first heat-exchanger and a partial refrigerant line connecting the first heat-exchanger and the second heat-exchanger may be closed by an operation of the third expansion valve. The first connection line may be opened by an operation of the second expansion valve. The second connection line may be closed by the operation of the second expansion valve. The third connection line may be opened by the operation of the third expansion valve. The rear connection line may be opened by an operation of the first valve and the second valve. The bypass line may be opened by an operation of the check valve. The fourth connection line may be closed by the operation of the second valve. The fifth connection line may be opened by the operation of the second valve. A partial refrigerant among the refrigerant discharged from the compressor may be introduced into the internal condenser along the refrigerant line. A remaining refrigerant among the refrigerant discharged from the compressor may be introduced into the third heat-exchanger along the fifth connection line and the rear connection line. The refrigerant discharged from the internal condenser may flow into the second heat-exchanger along the third connection line opened by the third expansion valve. The refrigerant having passed through the third heat-exchanger may flow to the refrigerant line along the bypass line and the rear connection line, and then may flow into the first connection line. An operation of the first expansion valve and the fourth expansion valve may be stopped. The second expansion valve may expand the refrigerant introduced via the first connection line and may flow the expanded refrigerant into the chiller. The third expansion valve may flow the refrigerant introduced via the refrigerant line to the third connection line without expansion.

The second heat-exchanger may exchange heat between the refrigerant having passed through the internal condenser and the refrigerant having passed through the chiller.

In a heating and dehumidification mode of the vehicle interior, the refrigerant line connecting the first expansion valve and the evaporator may be opened by an operation of the first expansion valve. The refrigerant line connecting the third expansion valve and the first heat-exchanger, and the refrigerant line connecting the first heat-exchanger and the second heat-exchanger may be closed by an operation of the third expansion valve. The first connection line may be opened by an operation of the second expansion valve. The second connection line may be closed by the operation of the second expansion valve. The third connection line may be opened by the operation of the third expansion valve. The rear connection line may be opened by an operation of the first valve and the second valve. The bypass line may be opened by an operation of the check valve. The fourth connection line may be closed by the operation of the second valve. The fifth connection line may be opened by the operation of the second valve. A partial refrigerant among the refrigerant discharged from the compressor may be introduced into the internal condenser along the refrigerant line. A remaining refrigerant among the refrigerant discharged from the compressor may be introduced into the third heat-exchanger along the fifth connection line and the rear connection line. The refrigerant discharged from the internal condenser may flow into the second heat-exchanger along the third connection line opened by the third expansion valve. The refrigerant having passed through the third heat-exchanger may flow along the bypass line and the rear connection line, and then may flow into the refrigerant line through the first valve. The first expansion valve may expand the refrigerant introduced from the rear connection line via the refrigerant line. The second expansion valve may expand the refrigerant introduced via the first connection line and may flow the expanded refrigerant into the chiller. The third expansion valve may flow the refrigerant introduced via the refrigerant line to the third connection line without expansion, and an operation of the fourth expansion valve may be stopped.

The second heat-exchanger may exchange heat between the refrigerant introduced via the third connection line and the refrigerant discharged from the evaporator and the chiller and introduced via the refrigerant line.

In a hot gas heating mode of the vehicle interior, the refrigerant line connecting the first valve and the first expansion valve may be closed by an operation of the first valve. The refrigerant line connecting the first expansion valve and the evaporator may be closed by the first expansion valve. The refrigerant line connecting the third expansion valve and the first heat-exchanger, and a partial refrigerant line connecting the first heat-exchanger and the second heat-exchanger may be closed by an operation of the third expansion valve. The first connection line may be opened by an operation of the second expansion valve. The second connection line may be closed by the operation of the second expansion valve. The third connection line may be opened by the operation of the third expansion valve. The rear connection line may be closed by an operation of the first valve and the second valve. The bypass line may be closed by an operation of the check valve. The fourth connection line may be opened by the operation of the second valve. The fifth connection line may be opened by the operation of the second valve. A partial refrigerant among the refrigerant discharged from the compressor may be introduced into the internal condenser along the refrigerant line. A remaining refrigerant among the refrigerant discharged from the compressor may be introduced into the second heat-exchanger from the fifth connection line along the fourth connection line. The refrigerant discharged from the internal condenser may flow into the second heat-exchanger along the third connection line opened by the third expansion valve. An operation of the first expansion valve and the fourth expansion valve may be stopped. The second expansion valve may expand the refrigerant introduced via the first connection line and may flow the expanded refrigerant into the chiller. The third expansion valve may flow the refrigerant introduced via the refrigerant line to the third connection line without expansion.

The second heat-exchanger may exchange heat between the refrigerant introduced via the third connection line and the refrigerant introduced from both the chiller and the fourth connection line via the refrigerant line.

The first valve and a second valve may be a 3-way valve configured to distribute flow amounts and control a flow of the refrigerant.

The third heat-exchanger may be configured to condense or evaporate the refrigerant through heat-exchange with the ambient air introduced into the rear HVAC module based on a selective operation of the fourth expansion valve.

A heat pump system for a vehicle may further include an accumulator provided on the refrigerant line between the second heat-exchanger and the compressor.

The second heat-exchanger may be a double-tube heat-exchanger or a plate-type heat-exchanger configured to exchange heat between the refrigerants having different temperatures.

The chiller may be connected to a heating element via a coolant line where the coolant circulates.

The chiller may be configured to exchange heat between the coolant introduced via the coolant line and the refrigerant to recollect waste heat of the heating element or to cool the heating element.

As described above, according to a heat pump system for a vehicle according to an embodiment, the temperature of the heating elements may be efficiently adjusted by using a chiller where a refrigerant and a coolant exchange heat.

In addition, according to the present disclosure, by efficiently performing cooling and heating of the rear seats of the vehicle by using a rear HVAC module provided with a heat exchanger, the layout of connection pipes may be streamlined, thus easily securing the mounting space.

In addition, according to the present disclosure, by minimizing the configuration of the rear HVAC module, the production cost may be reduced, and at the same time, the overall weight of the vehicle may be reduced.

In addition, according to the present disclosure, by efficiently managing the temperature of the heating element including the electrical component and the battery module, the optimal performance of the electrical component and the battery module may be achieved. Additionally, through efficient management of the battery module, the overall driving distance of the vehicle may be increased.

In addition, according to the present disclosure, in the heating mode of the vehicle interior, the ambient air heat and the waste heat of the heating element may be selectively used, and accordingly, the heating efficiency may be improved.

In addition, according to the present disclosure, by employing a heat-exchanger configured to exchange heat between a low-temperature refrigerant and a high-temperature refrigerant, an increase of sub-cooling of the refrigerant may be facilitated, and the overall performance and efficiency may be improved.

In addition, according to an embodiment, it is possible to reduce manufacturing cost and weight through the simplification of an entire system, and thus improve space utilization.

Other effects that may be obtained or are predicted by an embodiment will be explicitly or implicitly described in a detailed description of the present disclosure. In other words, various effects that are predicted according to an embodiment will be described in the following detailed description.

DETAILED DESCRIPTION

Figure 1:
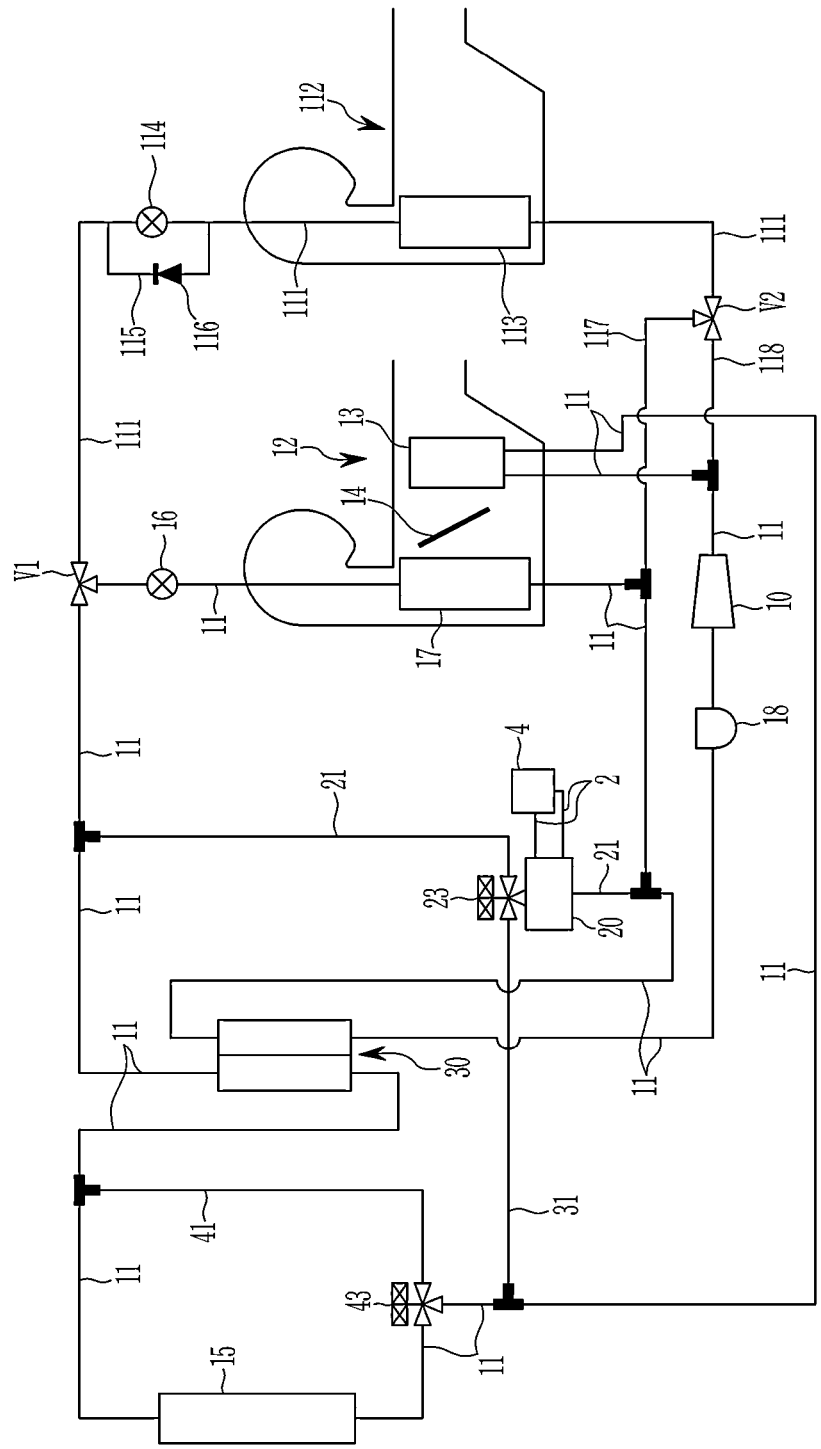
FIG. 1 is a block diagram of a heat pump system for a vehicle according to an embodiment.

Embodiments hereinafter are described in detail with reference to the accompanying drawings.

The embodiments disclosed in the present specification and the constructions depicted in the drawings are only example embodiments of the present disclosure, and do not cover the entire scope of the present disclosure. Therefore, it should be understood that there may be various equivalents and variations at the time of the application of this specification.

In order to clarify the present disclosure, parts that are not related to the description have been omitted. Also, the same elements or equivalents are referred to with the same reference numerals throughout the specification.

Also, the size and thickness of each element are arbitrarily shown in the drawings, but the present disclosure is not necessarily limited thereto. Additionally, in the drawings, the thickness of layers, films, panels, regions, and the like, are exaggerated for clarity.

In addition, unless explicitly described to the contrary, the terms "comprise" and variations such as "comprises" or "comprising", should be understood to imply the inclusion of stated elements but not the exclusion of any other elements.

When a component, device, element, or the like of the present disclosure is described as having a purpose or performing an operation, function, or the like, the component, device, or element should be considered herein as being "configured to" meet that purpose or perform that operation or function.

Furthermore, terms, such as " . . . unit", " . . . means", " . . . portions", " . . . part", and " . . . member" described in the specification, mean a unit of a comprehensive element that performs at least one function or operation.

FIG. 1 is a block diagram of a heat pump system for a vehicle according to an embodiment.

According to a heat pump system for a vehicle according to an embodiment, a temperature of a heating element 4 may be efficiently adjusted by using a chiller 20 where a refrigerant and a coolant exchange heat, and cooling and heating of a rear seat may be efficiently performed by using a rear heating, ventilation, and air conditioning (HVAC) module 112 provided with a third heat-exchanger 113.

The heating element 4 may include an electrical component and a battery module. The electrical component may include an electric power control apparatus, an inverter, or an on-board charger (OBC).

In other words, referring to FIG. 1, the heat pump system may include a compressor 10, a front heating, ventilation, and air-conditioning (HVAC) module 12, a first heat-exchanger 15, a first expansion valve 16, an evaporator 17, the chiller 20, a first connection line 21, a second heat-exchanger 30, a rear connection line 111, and the rear HVAC module 112.

First, the compressor 10 may compress the introduced refrigerant and flow the compressed refrigerant to the refrigerant line 11 such that the refrigerant may circulate along the refrigerant line 11.

In the present embodiment, a front HVAC module 12 may adjust a temperature of a front seat of a vehicle interior. The front HVAC module 12 may be internally provided with an internal condenser 13 and the evaporator 17 connected via the refrigerant line 11.

An opening/closing door 14 configured to adjust the ambient air having passed through the evaporator 17 to selectively flow into the internal condenser 13 may be provided inside the front HVAC module 12 between the evaporator 17 and the internal condenser 13.

The opening/closing door 14 may be opened at a time of heating the vehicle interior such that the ambient air having passed through the evaporator 17 may be introduced into the internal condenser 13.

In other words, the high-temperature refrigerant supplied to the internal condenser 13 may increase the temperature of the ambient air passing through the internal condenser 13. In other words, the introduced ambient air may be converted to a high-temperature state while passing through the internal condenser 13 and then introduced into the vehicle interior, thereby implementing heating of the vehicle interior.

To the contrary, at the time of cooling the vehicle interior, the opening/closing door 14 may close a side to the internal condenser 13 such that the ambient air cooled while passing through the evaporator 17 may be directly introduced into the vehicle interior.

Accordingly, the ambient air passing through the evaporator 17 may be cooled while passing through the evaporator 17 by the low-temperature refrigerant supplied to the evaporator 17. The cooled ambient air may be introduced into the vehicle interior, and thereby the vehicle interior may be cooled.

In the present embodiment, the first heat-exchanger 15 may be connected to the internal condenser 13 via the refrigerant line 11. The first heat-exchanger 15 may be disposed in the front portion of the vehicle.

In other words, the first heat-exchanger 15 may be an air-cooled heat-exchanger configured to exchange heat between the introduced refrigerant and the ambient air.

The first expansion valve 16 may be provided on the refrigerant line 11 connecting the first heat-exchanger 15 and the evaporator 17. The first expansion valve 16 may selectively expand the introduced refrigerant.

The heat pump system may further include an accumulator 18 provided on the refrigerant line 11 between the evaporator 17 and the compressor 10. The accumulator 18 may supply only the gaseous refrigerant to the compressor 10, and thereby may improve efficiency and durability of the compressor 10.

In the present embodiment, the chiller 20 may be provided on the first connection line 21. The chiller 20 may be connected to the heating element 4 via the coolant line 2 where the coolant circulates. Accordingly, the coolant may selectively circulate through an interior of the chiller 20.

The chiller 20 configured as such may adjust a temperature of the coolant by exchanging heat between the refrigerant introduced into the first connection line 21 and the coolant that is selectively introduced.

In more detail, the chiller 20 may exchange heat between the supplied refrigerant and the coolant to adjust the temperature of the coolant. The chiller 20 may be a water-cooled heat-exchanger that exchanges heat between the interiorly introduced refrigerant and the coolant.

A first end of the first connection line 21 may be connected to the refrigerant line 11 between the first heat-exchanger 15 and the first expansion valve 16. A second end of the first connection line 21 may be connected to the refrigerant line 11 between the evaporator 17 and the compressor 10.

In more detail, the second end of the first connection line 21 may be connected to the refrigerant line 11 between the evaporator 17 and the accumulator 18.

In other words, the chiller 20 may exchange heat between the coolant selectively introduced via the coolant line 2 and the selectively supplied refrigerant to adjust the temperature of the coolant. The coolant having heat-exchanged at the chiller 20 may circulate the heating element 4 via the coolant line 2.

A water pump (not shown) may be provided on the coolant line 2. In other words, the coolant may circulate via the coolant line 2 according to an operation of a water pump (not shown).

Accordingly, the coolant having heat-exchanged with the refrigerant at the chiller 20 may adjust the temperature of the electrical component and the battery module included in the heating element 4, while being selectively supplied to the heating element 4.

In other words, in a heating mode of the vehicle interior, or a heating and dehumidification mode of the vehicle interior, the coolant may circulate via the coolant line 2 such that the coolant having passed through the heating element 4 may be supplied to the chiller 20.

The chiller 20 may exchange heat between the coolant introduced via the coolant line 2 and the refrigerant to recollect the waste heat of the heating element 4, or may cool the heating element 4 by using the coolant having heat-exchanged with the refrigerant.

In the present embodiment, the second heat-exchanger 30 may be provided on the refrigerant line 11. The second heat-exchanger 30 may heat-exchange the refrigerant having passed through the internal condenser 13 or the first heat-exchanger 15 and the refrigerant having passed through at least one of the evaporator 17 and the chiller 20 with each other such that the condensation level may be increased by increasing sub-cooling of the refrigerant.

The second heat-exchanger 30 may be connected to the refrigerant line 11 connecting the first heat-exchanger 15 and the first expansion valve 16 and the refrigerant line 11 connecting the evaporator 17 and the compressor 10, respectively.

The second heat-exchanger 30 configured as such may be a double-tube heat-exchanger or a plate-type heat-exchanger configured to exchange heat between the refrigerants having different temperatures with each other.

The heat pump system configured as such may further include a second expansion valve 23, a second connection line 31, a third connection line 41, a third expansion valve 43.

First, the second expansion valve 23 may be provided on the first connection line 21 at an upstream end of the chiller 20.

The second expansion valve 23 may be an electronic expansion valve configured to selectively expand the supplied refrigerant while controlling the flow of the refrigerant.

The second expansion valve 23 may be disposed at the upstream end of the chiller 20, based on a flow direction of the refrigerant flowing to the chiller 20 along the first connection line 21.

In other words, the upstream end of the chiller 20 may be set based on the flow direction of the refrigerant. Based on the direction in which the refrigerant flows along the first connection line 21, a location at which the refrigerant flows into the chiller 20 may be defined as the upstream end of the chiller 20, and a location where the refrigerant is discharged from the chiller 20 may be defined as a downstream end of the chiller 20.

In the present embodiment, a first end of the second connection line 31 may be connected to the second expansion valve 23. A second end of the second connection line 31 may be connected to the refrigerant line 11 between the internal condenser 13 and the first heat-exchanger 15.

The third expansion valve 43 may be provided on the refrigerant line 11 between the internal condenser 13 and the first heat-exchanger 15.

The third expansion valve 43 may be an electronic expansion valve configured to selectively expand the supplied refrigerant while controlling the flow of the refrigerant.

The first heat-exchanger 15 may condense or evaporate the refrigerant through heat-exchange with the ambient air according to a selective operation of the third expansion valve 43.

A first end of the third connection line 41 may be connected to the third expansion valve 43. A second end of the third connection line 41 may be connected to the refrigerant line 11 between the first heat-exchanger 15 and the second heat-exchanger 30.

In the heat pump system configured as such, the refrigerant discharged from one or all of the evaporator 17 and the chiller 20 may exchange heat with the refrigerant supplied from the internal condenser 13 or the first heat-exchanger 15 at the second heat-exchanger 30, and then may be supplied to the compressor 10.

In other words, the refrigerant discharged from the internal condenser 13 or the first heat-exchanger 15 and the low-temperature and low-pressure refrigerant discharged from one or all of the evaporator 17 and the chiller 20 may flow into the second heat-exchanger 30.

Accordingly, the second heat-exchanger 30 may additionally exchange heat between the low-temperature refrigerant and the intermediate-temperature refrigerant to further lower the temperature of the intermediate refrigerant, and may increase the condensation level.

As such, the second heat-exchanger 30 may further condense the refrigerant condensed at the internal condenser 13 or the first heat-exchanger 15 to increase sub-cooling of the refrigerant. Accordingly, a coefficient of performance (COP), which is a coefficient of a cooling capability compared to a required compressor power, may be improved.

The rear connection line 111 may be connected to the refrigerant line 11 through at least one valve.

In addition, the third heat-exchanger 113 connected to the rear connection line 111 may be provided inside the rear HVAC module 112. At the time of cooling or heating the vehicle interior, the rear HVAC module 112 may adjust the temperature of the rear seat.

The heat pump system may further include a first valve V1, a fourth expansion valve 114, a bypass line 115, a check valve 116, a second valve V2, a fourth connection line 117, and a fifth connection line 118.

First, the first valve V1 may be provided on the refrigerant line 11 at an upstream end of the first expansion valve 16. A first end of the rear connection line 111 may be connected to the first valve V1.

In other words, the first valve V1 may be provided on the refrigerant line 11 between the second heat-exchanger 30 and the first expansion valve 16. The first valve V1 configured as such may selectively flow the refrigerant introduced via the refrigerant line 11 to at least one or all of the first expansion valve 16 and the rear connection line 111.

The fourth expansion valve 114 may be provided on the rear connection line 111 between the first valve V1 and the third heat-exchanger 113. The fourth expansion valve 114 may selectively expand the refrigerant introduced via the rear connection line 111.

The third heat-exchanger 113 may condense or evaporate the refrigerant through heat-exchange with the ambient air introduced into the rear HVAC module 112 according to a selective operation of the fourth expansion valve 114.

A first end of the bypass line 115 may be connected to the rear connection line 111 between the third heat-exchanger 113 and the fourth expansion valve 114. A second end of the bypass line 115 may be connected to the rear connection line 111 between the first valve V1 and the fourth expansion valve 114.

The check valve 116 may be provided on the bypass line 115. The check valve 116 may selectively open and close the bypass line 115 depending on the flow direction of the refrigerant flowing along the rear connection line 111.

In other words, the check valve 116 may be a one-way valve, and when the refrigerant flows from the third heat-exchanger 113 toward the fourth expansion valve 114 along the rear connection line 111, the check valve 116 may open the bypass line 115.

To the contrary, when the refrigerant flows from the first valve V1 toward the fourth expansion valve 114 along the rear connection line 111, the check valve 116 may close the bypass line 115.

Accordingly, the bypass line 115 may bypass the refrigerant by an operation of the check valve 116 such that the refrigerant having passed through the third heat-exchanger 113 may not be introduced into the fourth expansion valve 114.

On the other hand, the bypass line 115 may be closed by the operation of the check valve 116 such that the refrigerant flowing from the first valve V1 via the rear connection line 111 may be introduced into the fourth expansion valve 114.

In the present embodiment, the second valve V2 may be connected to a second end of the rear connection line 111.

The first valve V1 and the second valve V2 may be a 3-way valve capable of distributing flow amounts and controlling the flow of the refrigerant.

A first end of the fourth connection line 117 may be connected to the second valve V2. A second end of the fourth connection line 117 may be connected to the refrigerant line 11 between the evaporator 17 and the second heat-exchanger 30.

In addition, a first end of the fifth connection line 118 may be connected to the second valve V2. A second end of the fifth connection line 118 may be connected to the refrigerant line 11 between the compressor 10 and the internal condenser 13.

At the time of cooling or heating the vehicle interior, the fourth connection line 117 and the fifth connection line 118 configured as such may be selectively opened and closed by an operation of the second valve V2.

Hereinafter, an operation and action of a heat pump system for a vehicle according to an embodiment configured as described above is described in detail with reference to FIGS. 2-5.

First, an operation in a cooling mode of the vehicle interior is described in detail with reference to FIG. 2.

Figure 2:
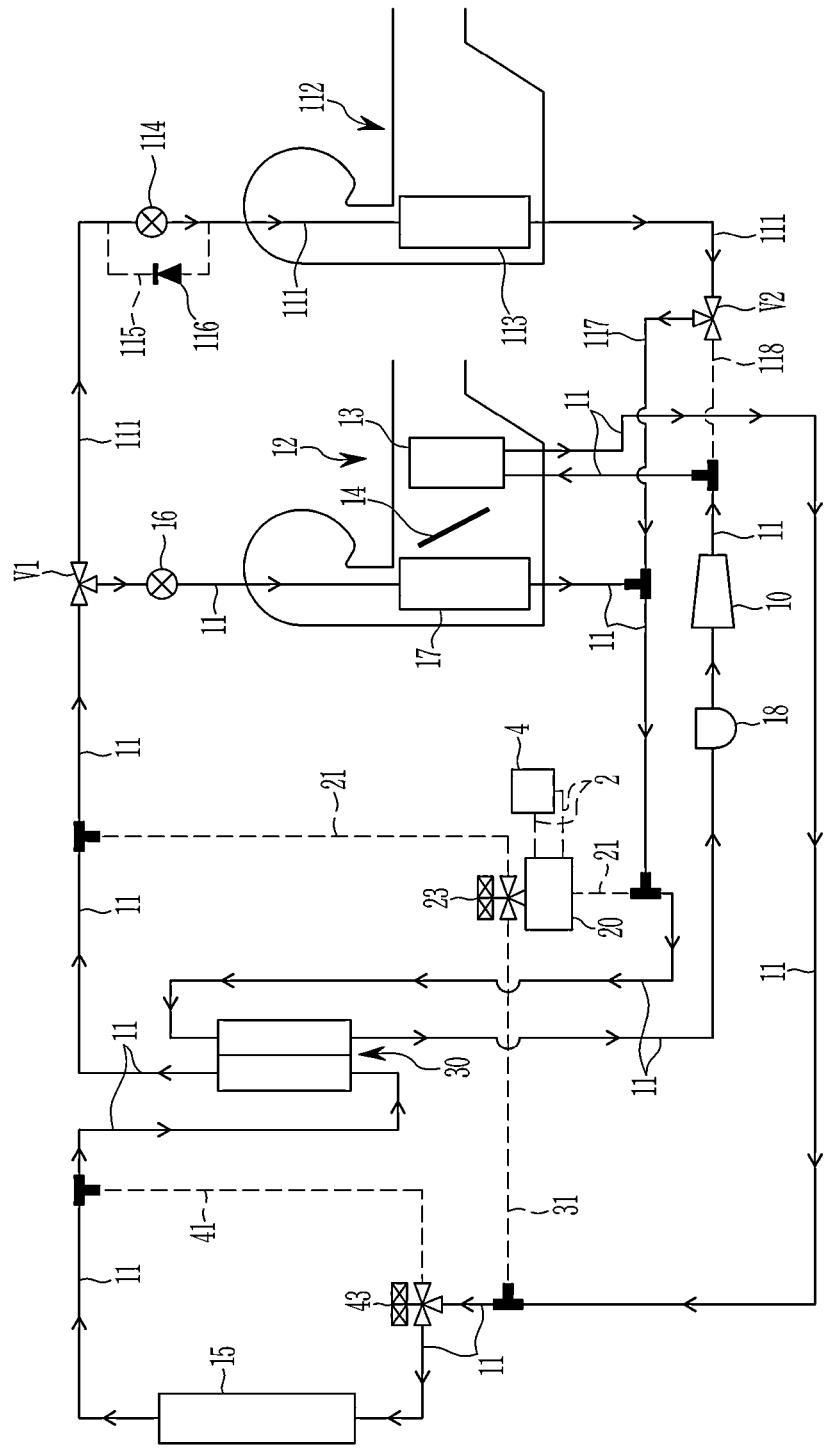
FIG. 2 is an operation diagram according to a cooling mode for a vehicle interior in a heat pump system for a vehicle according to an embodiment.

FIG. 2 is an operation diagram according to the cooling mode of the vehicle interior in a heat pump system for a vehicle according to an embodiment.

Referring to FIG. 2, in the cooling mode of the vehicle interior, the refrigerant line 11 may be fully opened such that respective components are connected.

In such a state, the first connection line 21 may be closed by an operation of the second expansion valve 23. At the same time, the second connection line 31 may be closed by the operation of the second expansion valve 23.

In other words, the operation of the second expansion valve 23 may be stopped.

The third connection line 41 may be closed by the operation of the third expansion valve 43.

In the present embodiment, the rear connection line 111 may be opened by the operation of the first valve V1 and the second valve V2. Accordingly, the rear connection line 111 may be connected to the refrigerant line 11.

The bypass line 115 may be closed by the operation of the check valve 116.

In addition, the fourth connection line 117 may be opened by the operation of the second valve V2. In addition, the fifth connection line 118 may be closed by the operation of the second valve V2.

In such a state, when the compressor 10 is operated in order to cool the vehicle interior, the refrigerant discharged from the compressor 10 may be introduced into the internal condenser 13 along the refrigerant line 11.

At this time, the opening/closing door 14 may be closed such that the ambient air introduced into the front HVAC module 12 may not pass through the internal condenser 13.

The refrigerant discharged from the internal condenser 13 may flow along the refrigerant line 11, and may flow into the first heat-exchanger 15 along the refrigerant line 11 opened by the third expansion valve 43.

The third expansion valve 43 may flow the refrigerant introduced via the refrigerant line 11 into the first heat-exchanger 15 without expansion.

Accordingly, the first heat-exchanger 15 may receive the refrigerant from the third expansion valve 43, and may condense it through heat-exchange with the ambient air.

The refrigerant having passed through the first heat-exchanger 15 may flow to the second heat-exchanger 30 along the refrigerant line 11. The refrigerant having passed through the second heat-exchanger 30 may be introduced into the first valve V1 along the refrigerant line 11.

A partial refrigerant among the refrigerant introduced into the first valve V1 may be introduced into the first expansion valve 16 along the refrigerant line 11. The first expansion valve 16 may expand the introduced refrigerant.

The refrigerant expanded at the first expansion valve 16 may be introduced into the evaporator 17 along the refrigerant line 11. The evaporator 17 may evaporate the introduced refrigerant through heat-exchange with the ambient air introduced into the front HVAC module 12.

The refrigerant evaporated at the evaporator 17 may pass through the second heat-exchanger 30 along the refrigerant line 11, and then may flow to the accumulator 18.

A remaining refrigerant among the refrigerant introduced into the first valve V1 may be introduced into the fourth expansion valve 114 along the rear connection line 111. The fourth expansion valve 114 may expand the introduced refrigerant.

The refrigerant expanded at the fourth expansion valve 114 may be introduced into the third heat-exchanger 113 along the rear connection line 111. The third heat-exchanger 113 may evaporate the introduced refrigerant through heat-exchange with the ambient air introduced into the rear HVAC module 112.

The refrigerant evaporated at the third heat-exchanger 113 may be introduced into the second valve V2 along the rear connection line 111, and then may flow along the opened fourth connection line 117.

In other words, the refrigerant having passed through the third heat-exchanger 113 may flow along the fourth connection line 117 connected to the rear connection line 111 through the second valve V2.

Accordingly, the refrigerant evaporated respectively at the evaporator 17 and the third heat-exchanger 113 may pass through the second heat-exchanger 30 along the refrigerant line 11, and then may flow to the accumulator 18.

The second heat-exchanger 30 may exchange heat between the refrigerant having passed through the first heat-exchanger 15 and the refrigerant having passed through the evaporator 17 and the third heat-exchanger 113 respectively.

In other words, the second heat-exchanger 30 may further condense the refrigerant condensed at the first heat-exchanger 15 to increase sub-cooling of the refrigerant. Accordingly, a coefficient of performance (COP), which is a coefficient of a cooling capability compared to a required compressor power, may be improved.

In addition, the refrigerant having passed through the accumulator 18 may repeatedly perform the above-described processes while being supplied to the compressor 10.

The ambient air introduced into the front HVAC module 12 may be cooled while passing through the evaporator 17 by the low-temperature refrigerant introduced into the evaporator 17.

At this time, the opening/closing door 14 may be closed such that the cooled ambient air may not pass through the internal condenser 13. Therefore, the cooled ambient air may be directly introduced into the front seat of the vehicle interior, and thereby the front seat of the vehicle interior may be smoothly cooled.

Simultaneously, the ambient air introduced into the rear HVAC module 112 may be cooled while passing through the third heat-exchanger 113 by the low-temperature refrigerant introduced into the third heat-exchanger 113. The cooled ambient air may be directly introduced into the rear seat of the vehicle interior, and thereby the rear seat of the vehicle interior may be smoothly cooled.

In the refrigerant whose condensation level is increased while sequentially passing through the first heat-exchanger 15 and the second heat-exchanger 30 is expanded and supplied to the evaporator 17 and the third heat-exchanger 113, and thereby may evaporate the refrigerant to a further lower temperature.

In other words, in the present embodiment, the first heat-exchanger 15 may cool the refrigerant through heat-exchange with the ambient air, and the second heat-exchanger 30 may additionally condense the refrigerant through heat-exchange with the low-temperature refrigerant.

By such operations, the heat pump system may more efficiently condense the refrigerant, and therefore, the forming of sub-cooling of the refrigerant may be advantageous.

In addition, as the refrigerant having been sub-cooled may be evaporated to a temperature lower than in the evaporator 17 and the third heat-exchanger 113, the temperature of the air passing through the evaporator 17 and the third heat-exchanger 113 may be further lowered. Accordingly, the cooling performance and efficiency may be improved.

While repeatedly performing the above-described processes, in the cooling mode of the vehicle interior, the refrigerant may smoothly cool the front seat and the rear seat.

Although, in the present embodiment, it is described that the vehicle interior is cooled, it is not limited thereto. When dehumidification is desired while cooling the vehicle interior, the opening/closing door 14 may be opened toward the internal condenser 13.

Accordingly, the air introduced into the front HVAC module 12 may be cooled by the low-temperature refrigerant introduced into the evaporator 17. Thereafter, the cooled ambient air may be dehumidified while passing through the internal condenser 13 and introduced into the vehicle interior, thereby smoothly cooling and dehumidifying the vehicle interior.

In the present embodiment, an operation in the heating mode of the vehicle interior is described in detail with reference to FIG. 3.

Figure 3:
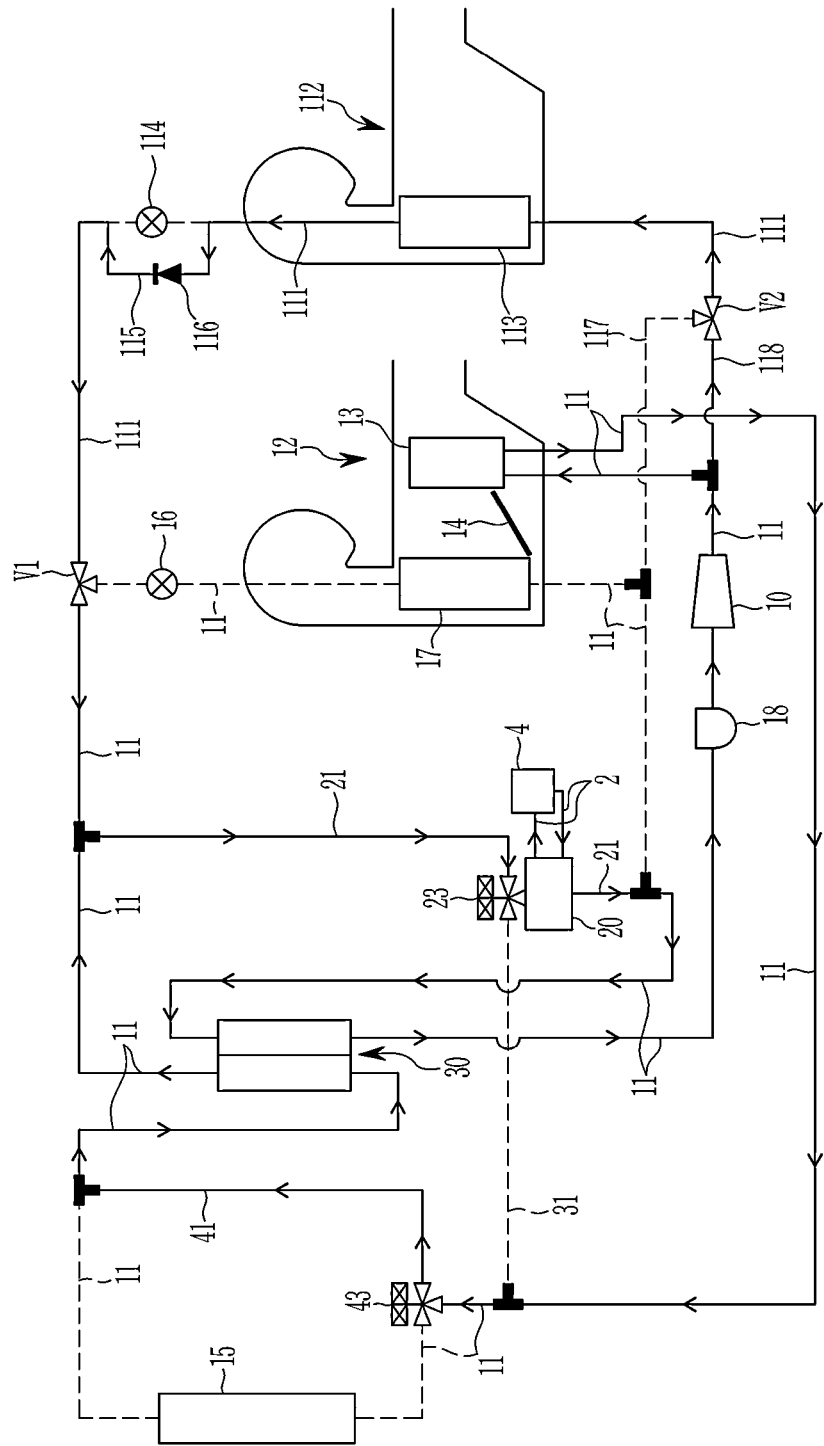
FIG. 3 is an operation diagram according to a heating mode for a vehicle interior in a heat pump system for a vehicle according to an embodiment.

FIG. 3 is an operation diagram according to the heating mode of the vehicle interior in a heat pump system for a vehicle according to an embodiment.

Referring to FIG. 3, the heat pump system may recollect the waste heat of the heating element 4 in the heating mode of the vehicle interior.

In the present embodiment, in the heating mode of the vehicle interior, the refrigerant line 11 connecting the first valve V1 and the first expansion valve 16 may be closed by an operation of the first valve V1.

Simultaneously, the refrigerant line 11 connecting the first expansion valve 16 and the evaporator 17 may be closed by the first expansion valve 16. An operation of the first expansion valve 16 may be stopped.

In addition, the refrigerant line 11 connecting the third expansion valve 43 and the first heat-exchanger 15 and a partial refrigerant line 11 connecting the first heat-exchanger 15 and the second heat-exchanger 30 may be closed by the operation of the third expansion valve 43.

The first connection line 21 may be opened by the operation of the second expansion valve 23.

In the present embodiment, the second connection line 31 may be closed by the operation of the second expansion valve 23. The third connection line 41 may be opened by the operation of the third expansion valve 43.

The rear connection line 111 may be opened by the operation of the first valve V1 and the second valve V2. Accordingly, the rear connection line 111 may be connected to the refrigerant line 11.

Simultaneously, the bypass line 115 may be opened by the operation of the check valve 116.

In addition, the fourth connection line 117 may be closed by the operation of the second valve V2. In addition, the fifth connection line 118 may be opened by the operation of the second valve V2.

In such a state, when the compressor 10 is operated in order to heat the vehicle interior, a partial refrigerant among the refrigerant discharged from the compressor 10 may be introduced into the internal condenser 13 along the refrigerant line 11.

At this time, the opening/closing door 14 may be opened such that the ambient air introduced into the front HVAC module 12 may pass through the internal condenser 13.

Accordingly, in the front HVAC module 12, when passing through the evaporator 17 that is not supplied with the refrigerant, the ambient air may be introduced at a room temperature state, which is not cooled. Thereafter, ambient air may be converted to a high-temperature state while passing through the internal condenser 13 and then introduced into the vehicle interior, thereby implementing heating of the front seat in the vehicle interior.

The refrigerant discharged from the internal condenser 13 may be introduced into the third connection line 41 by the operation of the third expansion valve 43.

The third expansion valve 43 may flow the refrigerant introduced via the refrigerant line 11 to the third connection line 41 without expansion.

The refrigerant flowing via the third connection line 41 may be introduced into the second heat-exchanger 30 along the refrigerant line 11. Thereafter, the refrigerant having passed through the second heat-exchanger 30 may flow to the first connection line 21.

The refrigerant introduced into the first connection line 21 may flow to the second expansion valve 23 via the first connection line 21. The second expansion valve 23 may expand the refrigerant introduced via the first connection line 21 and flow the expanded refrigerant into the chiller 20.

The coolant whose temperature is increased by absorbing the waste heat from the heating element 4 may be supplied to the chiller 2 via the coolant line 2. The coolant whose temperature is increased may be supplied to the chiller 20.

At this time, the chiller 20 may recollect the waste heat of the heating element 4 from the coolant whose temperature is increased through heat-exchange between the expanded refrigerant and the coolant.

In other words, according to a heat pump system according to when heating of the vehicle interior is desired, the present embodiment, by increasing the temperature of the refrigerant by using the waste heat of the heating element 4, the power consumption of the compressor 10 may be reduced, and the heating efficiency may be improved.

The refrigerant having passed through the chiller 20 may pass through the second heat-exchanger 30 along the refrigerant line 11, and then may flow to the accumulator 18.

A remaining refrigerant among the refrigerant discharged from the compressor 10 may be introduced into the third heat-exchanger 113 along the fifth connection line 118 and the rear connection line 111.

Accordingly, the ambient air in the rear HVAC module 112 may be converted to a high-temperature state while passing through the third heat-exchanger 113 and then introduced into the vehicle interior, thereby implementing heating of the rear seat in the vehicle interior.

The refrigerant having passed through the third heat-exchanger 113 may flow along the rear connection line 111, and then may flow along the opened bypass line 115. Accordingly, the refrigerant having passed through the third heat-exchanger 113 may flow via the bypass line 115 without passing through the fourth expansion valve 114, and then may be introduced into the first valve V1 along the rear connection line 111.

The refrigerant introduced into the first valve V1 may flow along the refrigerant line 11 connected to the first end of the first connection line 21, and may flow into the first connection line 21.

In other words, the refrigerant having passed through the internal condenser 13 and the refrigerant having passed through the third heat-exchanger 113 may flow via the first connection line 21.

The refrigerant flowing along the first connection line 21 may be expanded at the second expansion valve 23, and then may be introduced into the chiller 20.

In addition, the refrigerant having passed through the chiller 20 may pass through the second heat-exchanger 30, as described above, along the refrigerant line 11, and then may be introduced into the accumulator 18.

Accordingly, the second heat-exchanger 30 may exchange heat between the refrigerant having passed through the internal condenser 13 and the refrigerant having passed through the chiller 20 with each other.

In other words, the second heat-exchanger 30 may further condense the refrigerant condensed at the internal condenser 13 to increase sub-cooling of the refrigerant. Accordingly, a coefficient of performance (COP), which is a coefficient of a cooling capability compared to a required compressor power, may be improved.

In addition, the refrigerant having passed through the accumulator 18 may repeatedly perform the above-described processes while being supplied to the compressor 10.

While repeatedly performing such processes, in the heating mode of the vehicle interior, the refrigerant may smoothly heat the front seat and the rear seat.

In other words, according to a heat pump system according to the present embodiment, when heating of the vehicle interior is desired, by increasing the temperature of the refrigerant by using the waste heat of the heating element 4 recollected at the chiller 20, the power consumption of the compressor 10 may be reduced, and the heating efficiency may be improved.

In addition, according to the present disclosure, the heating efficiency and performance may be improved while minimizing the usage of a separate electric heater.

In the present embodiment, an operation for the heating and dehumidification mode of the vehicle interior is described in detail with reference to FIG. 4.

Figure 4:
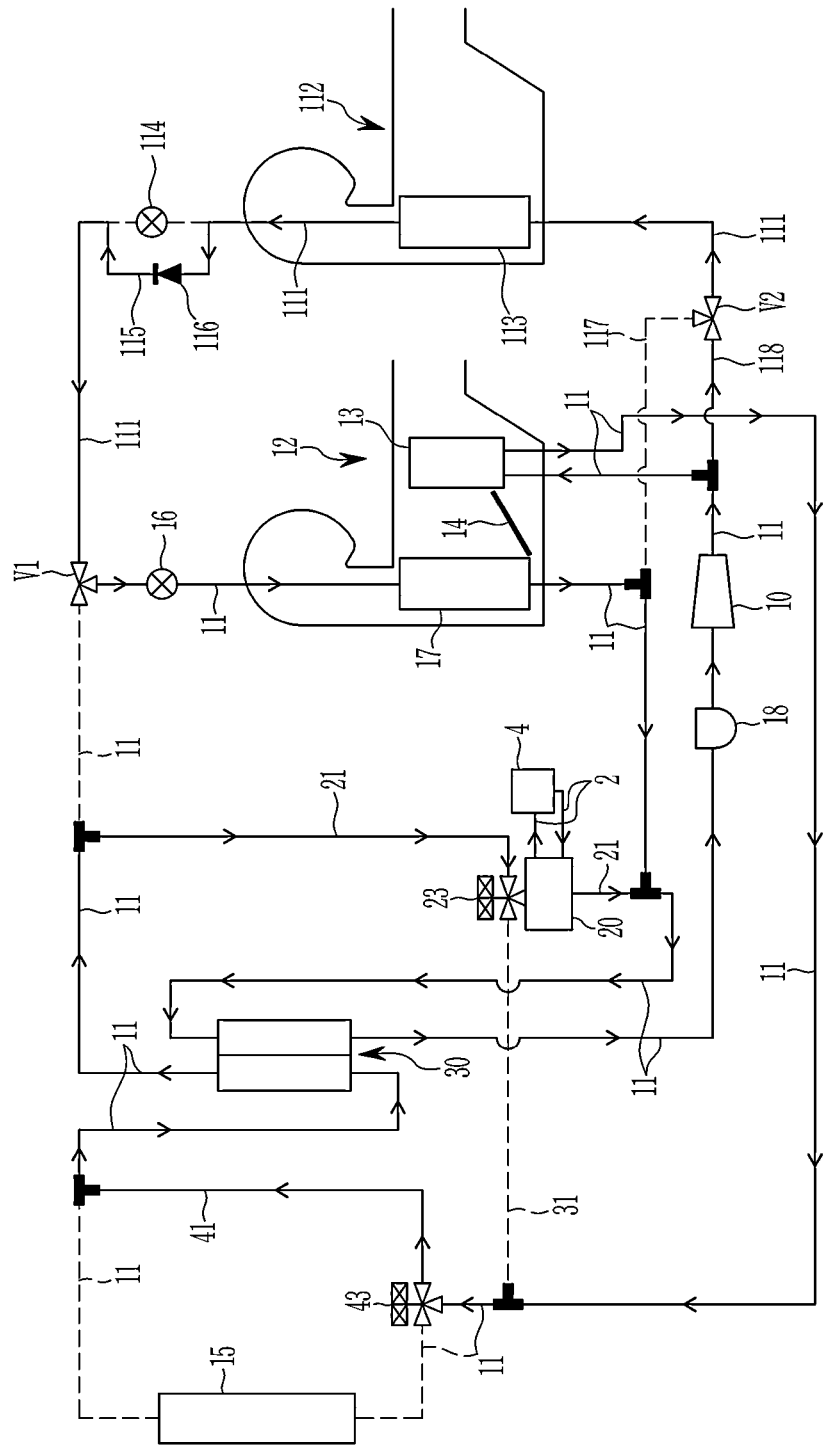
FIG. 4 is an operation diagram according to a heating and dehumidification mode for a vehicle interior in a heat pump system for a vehicle according to an embodiment.

FIG. 4 is an operation diagram according to the heating and dehumidification mode of the vehicle interior in a heat pump system for a vehicle according to an embodiment.

Referring to FIG. 4, in the heating and dehumidification mode of the vehicle interior, the refrigerant line 11 connecting the first expansion valve 16 and the evaporator 17 may be opened by the operation of the first expansion valve 16.

The first expansion valve 16 may expand the refrigerant introduced via the refrigerant line 11.

Simultaneously, the refrigerant line 11 connecting the third expansion valve 43 and the first heat-exchanger 15, and the refrigerant line 11 connecting the first heat-exchanger 15 and the second heat-exchanger 30 may be closed by the operation of the third expansion valve 43.

The first connection line 21 may be opened by the operation of the second expansion valve 23.

In the present embodiment, the second connection line 31 may be closed by the operation of the second expansion valve 23. The third connection line 41 may be opened by the operation of the third expansion valve 43.

The rear connection line 111 may be opened by the operation of the first valve V1 and the second valve V2. Accordingly, the rear connection line 111 may be connected to the refrigerant line 11.

The partial refrigerant line 11 connecting the first valve V1 and the first end of the first connection line 21 may be closed by the operation of the first valve V1.

Simultaneously, the bypass line 115 may be opened by the operation of the check valve 116.

In addition, the fourth connection line 117 may be closed by the operation of the second valve V2. In addition, the fifth connection line 118 may be opened by the operation of the second valve V2.

In such a state, when the compressor 10 is operated in order to heat and dehumidify the vehicle interior, the partial refrigerant among the refrigerant discharged from the compressor 10 may be introduced into the internal condenser 13 along the refrigerant line 11.

The refrigerant discharged from the internal condenser 13 may be introduced into the third connection line 41 by the operation of the third expansion valve 43.

The third expansion valve 43 may flow the refrigerant introduced via the refrigerant line 11 to the third connection line 41 without expansion.

The refrigerant flowing via the third connection line 41 may be introduced into the second heat-exchanger 30 along the refrigerant line 11. Thereafter, the refrigerant having passed through the second heat-exchanger 30 may flow to the first connection line 21.

The refrigerant introduced into the first connection line 21 may flow to the second expansion valve 23 via the first connection line 21. The second expansion valve 23 may expand the refrigerant introduced via the first connection line 21 and flow the expanded refrigerant into the chiller 20.

The coolant whose temperature is increased by absorbing the waste heat from the heating element 4 may be supplied to the chiller 2 via the coolant line 2. The coolant whose temperature is increased may be supplied to the chiller 20.

The chiller 20 may recollect the waste heat of the heating element 4 from the coolant whose temperature is increased through heat-exchange between the expanded refrigerant and the coolant.

In other words, according to a heat pump system according to the present embodiment, when heating of the vehicle interior is desired, by increasing the temperature of the refrigerant by using the waste heat of the heating element 4, the power consumption of the compressor 10 may be reduced, and the heating efficiency may be improved.

The refrigerant having passed through the chiller 20 may pass through the second heat-exchanger 30 along the refrigerant line 11, and then may flow to the accumulator 18.

The remaining refrigerant among the refrigerant discharged from the compressor 10 may be introduced into the third heat-exchanger 113 along the fifth connection line 118 and the rear connection line 111.

Accordingly, the ambient air in the rear HVAC module 112 may be converted to a high-temperature state while passing through the third heat-exchanger 113 and then introduced into the vehicle interior, thereby implementing heating of the rear seat in the vehicle interior.

The refrigerant having passed through the third heat-exchanger 113 may flow along the rear connection line 111, and then may flow along the opened bypass line 115. Accordingly, the refrigerant having passed through the third heat-exchanger 113 may flow to the bypass line 115 without passing through the fourth expansion valve 114, and then may be introduced into the first valve V1 along the rear connection line 111.

The refrigerant introduced into the first valve V1 may flow along the refrigerant line 11 connected to the first expansion valve 16, and may be introduced into the first expansion valve 16.

The first expansion valve 16 may expand the refrigerant. The refrigerant expanded at the first expansion valve 16 may be introduced into the evaporator 17 along the refrigerant line 11.

The opening/closing door 14 may be opened such that the ambient air introduced into the front HVAC module 12 may pass through the evaporator 17 and then flow into the internal condenser 13.

Accordingly, ambient air dehumidified while passing through the evaporator 17 may be converted to a high-temperature state while passing through the internal condenser 13 and then may be introduced into the vehicle interior, thereby heating and dehumidifying the vehicle interior.

In other words, the ambient air introduced into the front HVAC module 12 may be dehumidified while passing through the evaporator 17 by the low-temperature refrigerant introduced into the evaporator 17. Thereafter, by being converted to a high-temperature state while passing through the internal condenser 13 and introduced into the vehicle interior, the vehicle interior may be smoothly heated and dehumidified.

The refrigerant having passed through the evaporator 17 may pass through the second heat-exchanger 30 along the refrigerant line 11 together with the refrigerant having passed through the chiller 20, and then may be introduced into the accumulator 18.

The second heat-exchanger 30 may exchange heat between the refrigerant introduced from the internal condenser 13 via the third connection line 41 and the refrigerant line 11 and the refrigerant discharged from the evaporator 17 and the chiller 20 and introduced via the refrigerant line 11 with each other.

In other words, the second heat-exchanger 30 may further condense the refrigerant condensed at the internal condenser 13 to increase sub-cooling of the refrigerant. Accordingly, a coefficient of performance (COP), which is a coefficient of a cooling capability compared to a required compressor power, may be improved.

In addition, the refrigerant having passed through the accumulator 18 may repeatedly perform the above-described processes while being supplied to the compressor 10.

While repeatedly performing such processes, in the heating and dehumidification mode of the vehicle interior, the heat pump system may heat and dehumidify the front seat. At the same time, the heating pump system may smoothly heat the rear seat.

In addition, in the present embodiment, an operation in a hot gas heating mode of the vehicle interior is described in detail with reference to FIG. 5.

Figure 5:
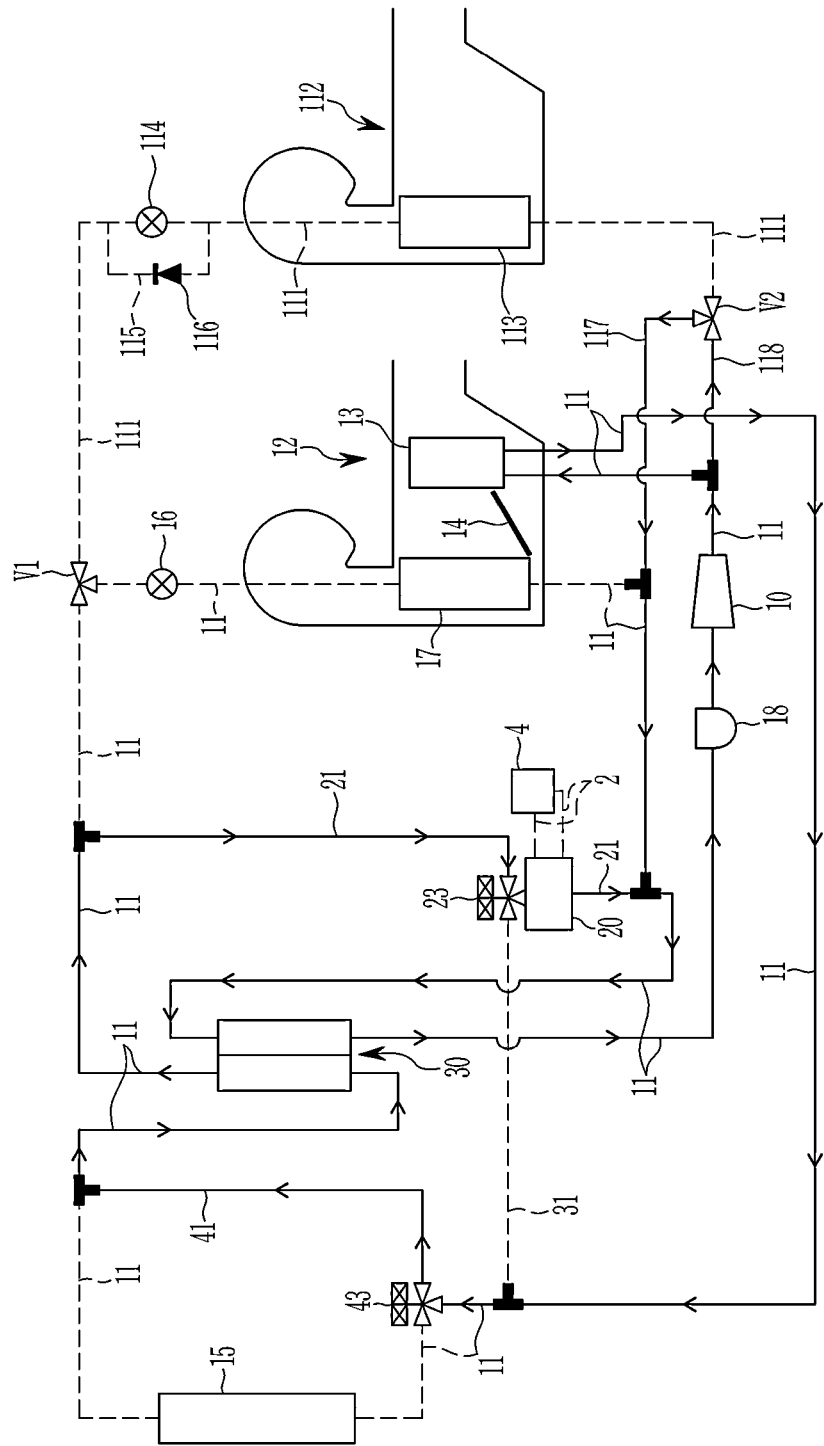
FIG. 5 is an operation diagram according to a hot gas heating mode for a vehicle interior in a heat pump system for a vehicle according to an embodiment.

FIG. 5 is an operation diagram with respect to the hot gas heating mode of the vehicle interior of a heat pump system for a vehicle according to an embodiment.

Referring to FIG. 5, when the waste heat of an ambient air heat and the heating element 4 is insufficient, the heat pump system may not recollect the heat.

In other words, when heating of the vehicle interior is desired in the state that the external temperature is low and the heat generated from the heating element 4 is insufficient in the early stage of driving the vehicle, the heat pump system may perform heating of the vehicle interior by directly using the high-pressure and the high-temperature refrigerant.

The heating of the vehicle interior by using only the refrigerant may be refer to as the hot gas heating mode.

In the present embodiment, in the hot gas heating mode of the vehicle interior, the refrigerant line 11 connecting the first valve V1 and the first expansion valve 16 may be closed by the operation of the first valve V1.

Simultaneously, the refrigerant line 11 connecting the first expansion valve 16 and the evaporator 17 may be closed by the first expansion valve 16. The operation of the first expansion valve 16 may be stopped.

In addition, the refrigerant line 11 connecting the third expansion valve 43 and the first heat-exchanger 15, and the partial refrigerant line 11 connecting the first heat-exchanger 15 and the second heat-exchanger 30 may be closed by the operation of the third expansion valve 43.

The first connection line 21 may be opened by the operation of the second expansion valve 23.

In the present embodiment, the second connection line 31 may be closed by the operation of the second expansion valve 23. The third connection line 41 may be opened by the operation of the third expansion valve 43.

The rear connection line 111 may be closed by the operation of the first valve V1 and the second valve V2. At the same time, the bypass line 115 may be closed by the operation of the check valve 116.

In addition, the fourth connection line 117 may be opened by the operation of the second valve V2. In addition, the fifth connection line 118 may be opened by the operation of the second valve V2.

In such a state, when the compressor 10 is operated in order to heat the vehicle interior, the partial refrigerant among the refrigerant discharged from the compressor 10 may be introduced into the internal condenser 13 along the refrigerant line 11.

At this time, the opening/closing door 14 may be opened such that the ambient air introduced into the front HVAC module 12 may pass through the internal condenser 13.

Accordingly, in the front HVAC module 12, when passing through the evaporator 17 that is not supplied with the refrigerant, the ambient air may be introduced at a room temperature state, which is not cooled. Thereafter, ambient air may be converted to a high-temperature state while passing through the internal condenser 13 and then introduced into the vehicle interior, thereby implementing heating of the front seat in the vehicle interior.

The refrigerant discharged from the internal condenser 13 may be introduced into the third connection line 41 opened by the operation of the third expansion valve 43.

The third expansion valve 43 may flow the refrigerant introduced via the refrigerant line 11 to the third connection line 41 without expansion.

The refrigerant flowing via the third connection line 41 may be introduced into the second heat-exchanger 30 along the refrigerant line 11. Thereafter, the refrigerant having passed through the second heat-exchanger 30 may flow to the first connection line 21.

The refrigerant introduced into the first connection line 21 may flow to the second expansion valve 23 via the first connection line 21. The second expansion valve 23 may expand the refrigerant introduced via the first connection line 21 and flow the expanded refrigerant into the chiller 20.

The refrigerant having passed through the chiller 20 may pass through the second heat-exchanger 30 along the refrigerant line 11, and then may flow to the accumulator 18.

The remaining refrigerant among the refrigerant discharged from the compressor 10 may be introduced into the second valve V2 along the fifth connection line 118.

The refrigerant introduced into the second valve V2 may be flow along the opened fourth connection line 117, may pass through the second heat-exchanger 30 along the refrigerant line 11 together with the refrigerant having passed through the chiller 20, and then may flow to the accumulator 18.

The refrigerant introduced into the accumulator 18 may be separated into a gas and a liquid, and a gaseous refrigerant among the refrigerant separated into gas and liquid may be introduced into the compressor 10, in which the above-described processes may be repeatedly performed.

As such, the refrigerant discharged from the compressor 10 may rapidly flow through the above-described processes, and accordingly, the hot gas heating of the vehicle interior may be performed more efficiently.

In other words, when the heat source is insufficient in the early stage of driving the vehicle while the external temperature is low, the heat pump system may heat the vehicle interior by using the high-temperature refrigerant supplied from the compressor 10, while repeatedly performing the above-described operation.

Therefore, as described above, when a heat pump system for a vehicle according to an embodiment is applied, the temperature of the heating element 4 may be efficiently adjusted by using the one chiller 20 where the refrigerant and the coolant exchange heat.

In addition, according to the present disclosure, by efficiently performing cooling and heating of the rear seat by using the rear HVAC module 112 provided with the a third heat-exchanger 113, the layout of connection pipes may be streamlined, and securing the mounting space may become easier.

In addition, according to the present disclosure, by minimizing the configuration of the rear HVAC module 112, the production cost may be reduced, and at the same time, the overall weight of the vehicle may be reduced.

In addition, according to the present disclosure, by efficiently managing the temperature of the heating element 4 including the electrical component and the battery module, the optimal performance of the electrical component and the battery module may be achieved. Additionally, through efficient management of the battery module, the overall driving distance of the vehicle may be increased.

In addition, according to the present disclosure, in the heating mode of the vehicle interior, by selectively using the ambient air heat and the waste heat of the heating element 4, the heating efficiency may be improved.

In addition, according to the present disclosure, by employing the second heat-exchanger 30 configured to exchange heat between the low-temperature refrigerant and the high-temperature refrigerant, an increase of sub-cooling of the refrigerant may be facilitated, and the overall performance and efficiency may be improved.

In addition, according to an embodiment, it is possible to reduce manufacturing cost and weight through simplification of an entire system, and thus improve space utilization.

While the present disclosure has been described in connection with what is presently considered to be practical embodiments, it should be understood that the present disclosure is not limited to the disclosed embodiments. On the contrary, the present disclosure is intended to cover various modifications and equivalent arrangements included within the spirit and scope of the appended claims.

DESCRIPTION OF SYMBOLS

2: coolant line
4: heating element
10: compressor
11: refrigerant line
12: front HVAC module
13: internal condenser
14: the opening/closing door
15: first heat-exchanger
16: first expansion valve
17: evaporator
18: accumulator
20: chiller
21: first connection line
23: second expansion valve
30: second heat-exchanger
31: second connection line
41: third connection line
43: third expansion valve
111: rear connection line
112: rear HVAC module
113: third heat-exchanger
114: fourth expansion valve
115: bypass line
116: check valve
117: fourth connection line
118: fifth connection line
V1, V2: first and second valves

What is claimed is:

1. A heat pump system for a vehicle, comprising:
a compressor configured to compress a refrigerant;
a front heating, ventilation, and air conditioning (HVAC) module configured to adjust a temperature of a front seat and including:
an internal condenser,
an evaporator connected to the compressor via a refrigerant line, and
an opening/closing door configured to adjust ambient air having passed through the evaporator to be selectively introduced into the internal condenser at a time of cooling or heating a vehicle interior;
a first heat-exchanger connected to the internal condenser via the refrigerant line;
a first expansion valve provided on the refrigerant line between the first heat-exchanger and the evaporator;
a first connection line including:
a first end connected to the refrigerant line between the first heat-exchanger and the first expansion valve, and
a second end connected to the refrigerant line between the evaporator and the compressor;
a chiller provided on the first connection line and configured to exchange heat between a coolant and the refrigerant to adjust a temperature of the coolant;
a second heat-exchanger provided on the refrigerant line and configured to exchange heat between the refrigerant having passed through the internal condenser or the first heat-exchanger and the refrigerant having passed through at least one of the evaporator and the chiller such that a condensation level is increased by increasing sub-cooling of the refrigerant;
a rear connection line connected to the refrigerant line through at least one valve; and
a rear HVAC module interiorly provided with a third heat-exchanger connected to the rear connection line and configured to adjust a temperature of a rear seat at the time of cooling or heating the vehicle interior.

2. The heat pump system of claim 1, wherein the second heat-exchanger is connected to the refrigerant line connecting the first heat-exchanger and the first expansion valve and to the refrigerant line connecting the evaporator and the compressor, respectively.

3. The heat pump system of claim 1, further comprising:
a second expansion valve provided on the first connection line at an upstream end of the chiller;
a second connection line having a first end connected to the second expansion valve and a second end connected to the refrigerant line between the internal condenser and the first heat-exchanger;
a third expansion valve provided on the refrigerant line between the internal condenser and the first heat-exchanger;
a third connection line having a first end connected to the third expansion valve and a second end connected to the refrigerant line between the first heat-exchanger and the second heat-exchanger;
a first valve provided on the refrigerant line at an upstream end of the first expansion valve, and connected to a first end of the rear connection line;
a fourth expansion valve provided on the rear connection line between the first valve and the third heat-exchanger;
a bypass line having a first end connected to the rear connection line between the third heat-exchanger and the fourth expansion valve, and a second end connected to the rear connection line between the first valve and the fourth expansion valve; and
a check valve provided on the bypass line.

4. The heat pump system of claim 3, wherein the first heat-exchanger is configured to condense or evaporate the refrigerant through heat-exchange with the ambient air based on a selective operation of the third expansion valve.

5. The heat pump system of claim 3, wherein the second expansion valve and the third expansion valve are electronic expansion valves configured to selectively expand the supplied refrigerant while controlling a flow of the refrigerant.

6. The heat pump system of claim 3, further comprising:
a second valve connected to a second end of the rear connection line;
a fourth connection line having a first end connected to the second valve and a second end connected to the refrigerant line between the evaporator and the second heat-exchanger; and
a fifth connection line having a first end connected to the second valve and a second end connected to the refrigerant line between the compressor and the internal condenser.

7. The heat pump system of claim 6, wherein, in a cooling mode of the vehicle interior:
the first connection line is closed by an operation of the second expansion valve;
the second connection line is closed by the operation of the second expansion valve;
the third connection line is closed by an operation of the third expansion valve;
the rear connection line is opened by an operation of the first valve and the second valve;
the bypass line is closed by an operation of the check valve;

the fourth connection line is opened by the operation of the second valve;

the fifth connection line is closed by the operation of the second valve;

the refrigerant discharged from the internal condenser flows along the refrigerant line, and flows into the first heat-exchanger along the refrigerant line opened by the third expansion valve;

the refrigerant having passed through the third heat-exchanger flows along the fourth connection line connected to the rear connection line through the second valve;

the first expansion valve and the fourth expansion valve expand the introduced refrigerant;

the operation of the second expansion valve is stopped; and the third expansion valve flows the refrigerant introduced via the refrigerant line to the first heat-exchanger without expansion.

8. The heat pump system of claim 7, wherein the second heat-exchanger exchanges heat between the refrigerant having passed through the first heat-exchanger and the refrigerant having passed through the evaporator and the third heat-exchanger respectively.

9. The heat pump system of claim 6, wherein, in a heating mode of the vehicle interior:

the refrigerant line connecting the first valve and the first expansion valve is closed by an operation of the first valve;

the refrigerant line connecting the first expansion valve and the evaporator is closed by the first expansion valve;

the refrigerant line connecting the third expansion valve and the first heat-exchanger and a partial refrigerant line connecting the first heat-exchanger and the second heat-exchanger is closed by an operation of the third expansion valve;

the first connection line is opened by an operation of the second expansion valve;

the second connection line is closed by the operation of the second expansion valve;

the third connection line is opened by the operation of the third expansion valve;

the rear connection line is opened by an operation of the first valve and the second valve;

the bypass line is opened by an operation of the check valve;

the fourth connection line is closed by the operation of the second valve;

the fifth connection line is opened by the operation of the second valve;

a partial refrigerant among the refrigerant discharged from the compressor is introduced into the internal condenser along the refrigerant line;

a remaining refrigerant among the refrigerant discharged from the compressor is introduced into the third heat-exchanger along the fifth connection line and the rear connection line;

the refrigerant discharged from the internal condenser flows into the second heat-exchanger along the third connection line opened by the third expansion valve;

the refrigerant having passed through the third heat-exchanger flows to the refrigerant line along the bypass line and the rear connection line, and then flows into the first connection line;

an operation of the first expansion valve and the fourth expansion valve is stopped;

the second expansion valve expands the refrigerant introduced via the first connection line and flows the expanded refrigerant into the chiller; and the third expansion valve flows the refrigerant introduced via the refrigerant line to the third connection line without expansion.

10. The heat pump system of claim 9, wherein the second heat-exchanger exchanges heat between the refrigerant having passed through the internal condenser and the refrigerant having passed through the chiller.

11. The heat pump system of claim 6, wherein, in a heating and dehumidification mode of the vehicle interior:

the refrigerant line connecting the first expansion valve and the evaporator is opened by an operation of the first expansion valve;

the refrigerant line connecting the third expansion valve and the first heat-exchanger, and the refrigerant line connecting the first heat-exchanger and the second heat-exchanger is closed by an operation of the third expansion valve;

the first connection line is opened by an operation of the second expansion valve;

the second connection line is closed by the operation of the second expansion valve;

the third connection line is opened by the operation of the third expansion valve;

the rear connection line is opened by an operation of the first valve and the second valve;

the bypass line is opened by an operation of the check valve;

the fourth connection line is closed by the operation of the second valve;

the fifth connection line is opened by the operation of the second valve;

a partial refrigerant among the refrigerant discharged from the compressor is introduced into the internal condenser along the refrigerant line;

a remaining refrigerant among the refrigerant discharged from the compressor is introduced into the third heat-exchanger along the fifth connection line and the rear connection line;

the refrigerant discharged from the internal condenser flows into the second heat-exchanger along the third connection line opened by the third expansion valve;

the refrigerant having passed through the third heat-exchanger flows along the bypass line and the rear connection line, and then flows into the refrigerant line through the first valve;

the first expansion valve expands the refrigerant introduced from the rear connection line via the refrigerant line;

the second expansion valve expands the refrigerant introduced via the first connection line and flows the expanded refrigerant into the chiller;

the third expansion valve flows the refrigerant introduced via the refrigerant line to the third connection line without expansion; and an operation of the fourth expansion valve is stopped.

12. The heat pump system of claim 11, wherein:

the second heat-exchanger exchanges heat between the refrigerant introduced via the third connection line and the refrigerant discharged from the evaporator and the chiller and introduced via the refrigerant line.

13. The heat pump system of claim 6, wherein, in a hot gas heating mode of the vehicle interior:

the refrigerant line connecting the first valve and the first expansion valve is closed by an operation of the first valve;

the refrigerant line connecting the first expansion valve and the evaporator is closed by the first expansion valve;

the refrigerant line connecting the third expansion valve and the first heat-exchanger, and a partial refrigerant line connecting the first heat-exchanger and the second heat-exchanger is closed by an operation of the third expansion valve;

the first connection line is opened by an operation of the second expansion valve;

the second connection line is closed by the operation of the second expansion valve;

the third connection line is opened by the operation of the third expansion valve;

the rear connection line is closed by an operation of the first valve and the second valve;

the bypass line is closed by an operation of the check valve;

the fourth connection line is opened by the operation of the second valve;

the fifth connection line is opened by the operation of the second valve;

a partial refrigerant among the refrigerant discharged from the compressor is introduced into the internal condenser along the refrigerant line;

a remaining refrigerant among the refrigerant discharged from the compressor is introduced into the second heat-exchanger from the fifth connection line along the fourth connection line;

the refrigerant discharged from the internal condenser flows into the second heat-exchanger along the third connection line opened by the third expansion valve;

an operation of the first expansion valve and the fourth expansion valve is stopped;

the second expansion valve expands the refrigerant introduced via the first connection line and flows the expanded refrigerant into the chiller; and the third expansion valve flows the refrigerant introduced via the refrigerant line to the third connection line without expansion.

14. The heat pump system of claim 13, wherein the second heat-exchanger exchanges heat between the refrigerant introduced via the third connection line and the refrigerant introduced from both the chiller and the fourth connection line via the refrigerant line.

15. The heat pump system of claim 3, wherein the first valve and a second valve are a 3-way valve configured to distribute flow amounts and control a flow of the refrigerant.

16. The heat pump system of claim 3, wherein the third heat-exchanger is configured to condense or evaporate the refrigerant through heat-exchange with the ambient air introduced into the rear HVAC module based on a selective operation of the fourth expansion valve.

17. The heat pump system of claim 1, further comprising an accumulator provided on the refrigerant line between the second heat-exchanger and the compressor.

18. The heat pump system of claim 1, wherein the second heat-exchanger is a double-tube heat-exchanger or a plate-type heat-exchanger configured to exchange heat between the refrigerants having different temperatures.

19. The heat pump system of claim 1, wherein the chiller is connected to a heating element via a coolant line where the coolant circulates.

20. The heat pump system of claim 19, wherein the chiller is configured to exchange heat between the coolant introduced via the coolant line and the refrigerant to recollect waste heat of the heating element or to cool the heating element.

* * * * *